United States Patent [19]

Hiltebrandt

[11] Patent Number: 4,830,458

[45] Date of Patent: May 16, 1989

[54] APPARATUS FOR CONNECTING AN ENDOSCOPE OR TECHNOSCOPE COMPRISING LIGHT-GUIDING FIBER-OPTIC BUNDLES TO A LIGHT GUIDING CABLE AND A METHOD FOR THE MANUFACTURE THEREOF

[75] Inventor: Siegfried Hiltebrandt, Knittlingen, Fed. Rep. of Germany

[73] Assignee: Richard Wolf, GmbH, Fed. Rep. of Germany

[21] Appl. No.: 20,346

[22] Filed: Mar. 2, 1987

[30] Foreign Application Priority Data

Mar. 4, 1986 [DE] Fed. Rep. of Germany ....... 3606990
Feb. 11, 1987 [DE] Fed. Rep. of Germany ....... 3704162

[51] Int. Cl.⁴ .................................................. G02B 6/40
[52] U.S. Cl. .............................. 350/96.22; 350/96.24; 350/96.26
[58] Field of Search ............... 350/96.24, 96.25, 96.26, 350/96.27

[56] References Cited

U.S. PATENT DOCUMENTS

| | | | |
|---|---|---|---|
| 3,525,561 | 8/1970 | Takahashi | 350/96.25 |
| 3,556,085 | 1/1971 | Takahashi | 128/6 |
| 3,699,312 | 10/1972 | Jones et al. | 350/96.25 X |
| 3,874,783 | 3/1974 | Cole | 350/96.27 |
| 4,154,502 | 5/1979 | Siegmund | 350/96.26 |
| 4,492,424 | 1/1985 | Clegg | 350/96.24 X |

FOREIGN PATENT DOCUMENTS 2333910 2/1974 Fed. Rep. of Germany .

Primary Examiner—John D. Lee
Assistant Examiner—John Ngo
Attorney, Agent, or Firm—Hill, Van Santen, Steadman & Simpson

[57] ABSTRACT

A planar end face is ground such that at the end of the light-conducting fiber-optical bundle of an endoscope or technoscope the center axis of all light-conducting fibers discharge into the end face at an angle differing from 90°. The light-conducting fibers can either be arranged parallel to the longitudinal axis of the bundle of the fiber optical bundle and the end face can be ground obliquely relative to the longitudinal axis of the bundle or the light-conducting fibers can be helically arranged around the longitudinal axis of the bundle and the end face can be ground perpendicular to the longitudinal axis of the bundle. Given employment of standard and existing light projectors and light-conducting cables, the light exit angle at the distal end of the fiber-optical bundle can thereby be increased without significant light losses.

9 Claims, 1 Drawing Sheet

APPARATUS FOR CONNECTING AN ENDOSCOPE OR TECHNOSCOPE COMPRISING LIGHT-GUIDING FIBER-OPTIC BUNDLES TO A LIGHT GUIDING CABLE AND A METHOD FOR THE MANUFACTURE THEREOF

The invention is directed to an apparatus for connecting a bundle of optical light-conducting fibers arranged in a technical or medical instrument such as an endoscope or technoscope, to a light conducting cable by having a proximal end of the bundle fixed in a mount and having a planar end face and is also directed to a method for the manufacture thereof.

The light exit angle of a light-guiding fiber-optic bundle is essentially determined by the angle at which the light rays enter into the light-conducting fibers or glass fibers and it is identical to the latter when the light rays enter into the end face of every glass fiber within a calculatable critical angle, and the lateral limiting surfaces of the fibers lie parallel to one another (i.e., are not, for example, conically fashioned), and do not proceed curved over their longitudinal extent. Rays impinging the end faces of the glass fibers outside of the said critical angle are already reflected at this end face. Even minute furrows in the inside of the glass fibers, roughness of the surfaces and the bending of glass fibers influence the angle of the emerging light rays.

Given the most frequently employed glass fibers, the aperture, i.e., half the angle at which the marginal rays can still enter into the glass fibers, amounts to between 40° and 42.5°, so that the field of view of about 80° through 85° corresponding to double the aperture can thus be illuminated. In addition to these glass fibers which are most frequently employed, what are referred to as wide-angle fibers having an aperture of greater than 60° are also available, these, however, exhibiting the considerable disadvantage of modifying the spectral transmission characteristic of the light conducted through the fibers given a fiber length of more than 700 mm, so that the objects illuminated with such illuminated wide-angle fibers do not appear white but yellowish. In technology in general but quite specifically in endoscopy and technoscopy, there is a need to be able to illuminate an optimally great object field having a field of view of more than 75° with a light-guiding cable. Particularly in endoscopy, therefore, wide-angle fibers have already been employed, whereby the light of a light projector was introduced into the proximal connecting end of the light-guiding cable by means of a light-conducting cable containing these wide-angle fibers, having been introduced upon interposition of an optical-fiber cone. Although such fiber-optical cones enlarge the aperture of the arrangement, they also exhibit the disadvantage that a light loss occurs as a consequence of the additional separating location, this light loss potentially amounting to up to 50% under unfavorable conditions.

In another, known embodiment, the condenser system of a light projector was fashioned such in an endoscope that the aperture magnification was already achieved by the employed light source itself. This solution, however, presumes that a special light-guiding cable is arranged for light transmission between light projector and endoscope, wherewith the light-guiding cables already being employed and only transmitting a lower aperture could no longer be utilized for further employment.

SUMMARY OF THE INVENTION

It is therefore the object of the invention to create a device for connection of a technical or medical instrument, particularly of an endoscope or of a technoscope, comprising light-guiding fiber-optical bundle to a light-guiding cable and to also create a method for the manufacture thereof, whereby light projectors and light-guiding cables fashioned in a standard way and light-guiding cables already existing can be employed in order to illuminate an optimally large object field upon retention of the spectral light transmission characteristic.

The above objects are achieved by an improvement of an apparatus for connecting or coupling an optical bundle of light-conducting fiber for a technical or medical instrument, particularly in an endoscope or technoscope to a coupling part of a light conducting cable wherein a proximal end of the bundle is fixed in a mount and has a planar end face, said mount being adapted for coupling to said coupling part. The improvements are that the center axis of all the fiber of the bundle extend at an angle differing from 90° to the plane of the end face of each fiber and the end face of the bundle.

The oblique arrangement of the end faces of every individual light-conducting fiber forming the planar end face of the light-guiding fiber-optic bundle in the endoscope or technoscope, namely the oblique arrangement thereof relative to the center axis of the fiber, effects an increase in the light exit angle at the exit end, for example, at the distal end of an endoscope, without effecting a significant modification of the spectral light transmission characteristic.

In a first embodiment of the manufacturing method of the invention, the light-conducting fibers at the proximal end of the fiber bundle are arranged parallel and are fixed in a mount. The oblique position of the end faces of the individual light-conducting fibers can then be achieved in a simple way in that the entire bundle end fixed in the mount, for example, by gluing, is obliquely ground and polished.

In a second embodiment, the proximal end of the fiber-optical bundle is turned around the longitudinal axis of the bundle by a predetermined angle and is not glued into a mount until thereafter. This bundle end is then ground and polished perpendicular to the axis of the bundle. A helical arrangement of every individual light-conducting fiber wherein the center axis of the fiber discharges obliquely into an end face residing perpendicular relative to the bundle axis derives, namely, due to the turning of the bundle end at the proximal side.

The mounts in which the bundle ends of the light-conducting fibers are fixed can, for example, be cable connecting parts. The angle between center axis of the fiber and axis of the bundle can be arbitrarily selected within broad limits. In a preferred embodiment, it lies at about 10°.

Given employment of standard and existing light projectors and light-conducting cables, the light exit angle at the distal end of the fiber-optical bundle arranged in a technoscope or endoscope can thereby be increased without significant light losses.

Advantageous exemplary embodiments of the invention shall be set forth in greater detail with reference to the figures.

DESCRIPTION OF THE PREFERRED EMBODIMENTS

Figures 1, 2:
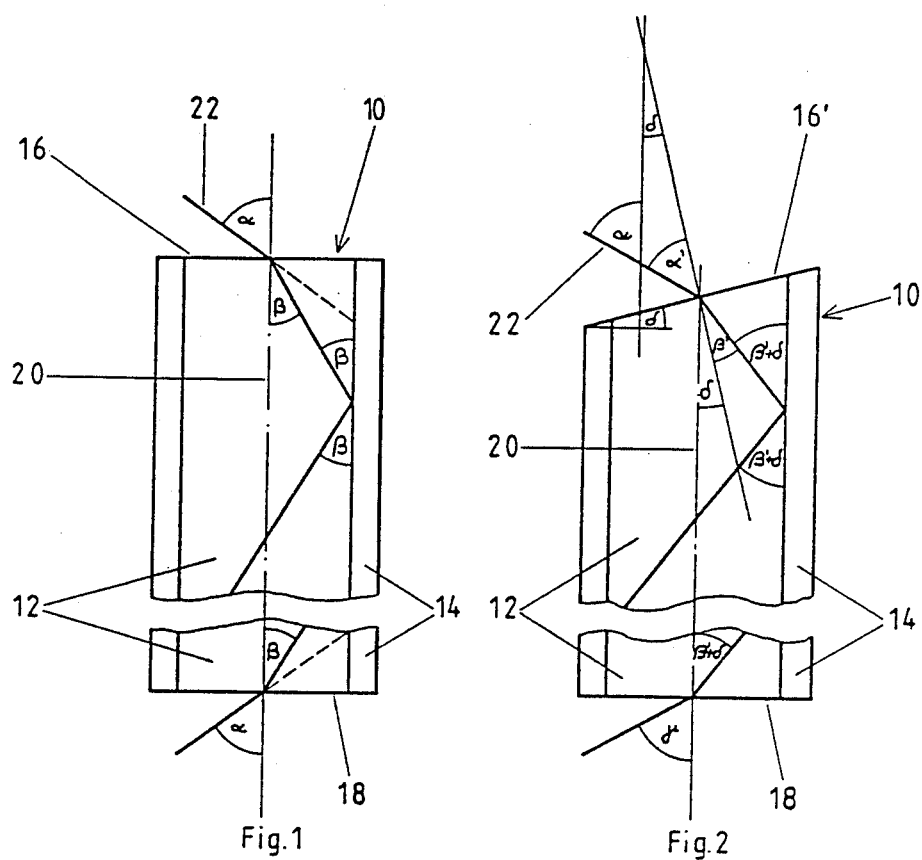
FIGS. 1 and 2 are schematic views of the light ray guidance given a traditional, perpendicular fiber end face or, respectively, given an obliquely ground end face.

The same reference characters are employed in all figures for identical or corresponding parts. The light-conducting fiber shown in FIG. 1 and referenced 10 overall comprises a fiber core 12 and a fiber cladding 14 whose refractive index is lower than that of the fiber core. The end faces 16 and 18 at the ends of the light-conducting fiber 10 are ground perpendicular to the center axis 20. The light ray 22 impinging the face end 16 at the angle of incidence $\alpha$ is therefore conducted in the optical fiber core 12 at the refracting angle $\beta$ and is totally reflected at the fiber cladding 14 at the same angle. The light ray then in turn emerges at the likewise perpendicular exit face 18 at the angle $\alpha$ corresponding to the angle of incidence.

In accord with the invention, as shown in FIG. 2, the entry end face 16' of the light conducting fiber 10 is arranged at an angle $\delta$ relative to the center axis 20 of the light-conducting fiber. A light ray 22 incident at the angle $\alpha$ relative to the center axis 20 has the angle of incidence $\alpha'$ relative to the face end 16' which is diminished by the angle $\delta$ and has the refracting angle $\beta'$ likewise diminished by the angle $\delta$. It is totally reflected at the cladding 14 at the angle ($\beta'+\delta$) and emerges from the perpendicular end face 18 at the other end of the light-conducting fiber under the angle $\gamma$ increased with respect to the angle $\alpha$. Due to the oblique arrangement of the entry end face 16', therefore, the exit angle $\gamma$ is increased in comparison to the entry angle $\alpha$.

Figures 3, 4:
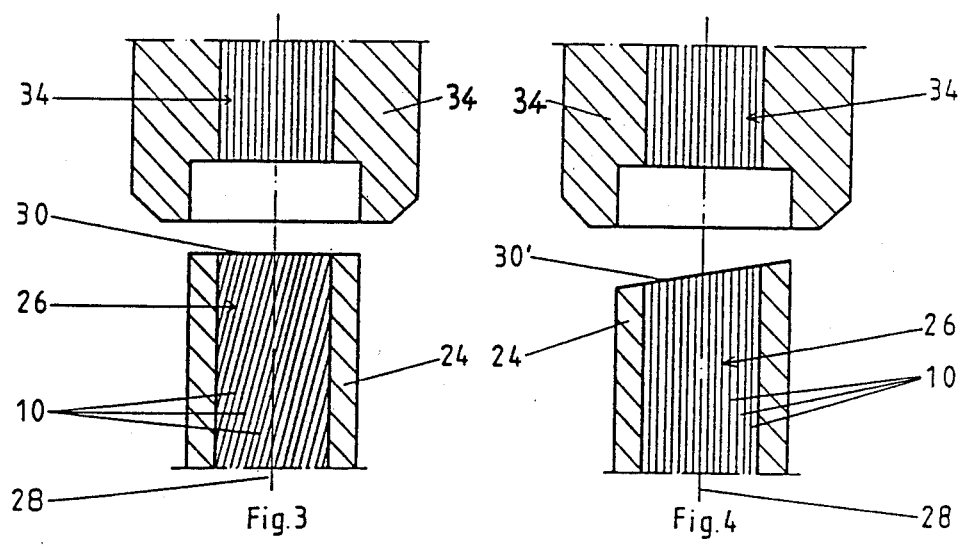
FIGS. 3 and 4 are cross-sectional views through two exemplary embodiments of the proximal end of a light-guiding fiber-optical bundle employed in accord with the invention, comprising appertaining connecting parts of a light-guiding cable.

Given the embodiment of the connection means of the invention shown in FIG. 3, the end of the fiber-optical bundle 26 arranged in an endoscope or technoscope (neither shown) is surrounded by a mount or envelope 24 and is glued therein. The invididual light-conducting fibers 10 are arranged helically turned with respect to the longitudinal axis 28 of the bundle and a planar end face 30 which resides perpendicularly relative to the longitudinal axis 28 of the bundle is ground at the end. The center axes of all light-conducting fibers 10 therefore discharge obliquely into the end face 30. A connector coupling part 32 of a light-conducting cable 34 is shown in the upper part of FIG. 3, this light-conducting cable 34 supplying the light of a light projector (not shown) to the endoscope or technoscope. The mount 24 can be coupled to the coupling part 32 in a simple way.

In the embodiment of the invention shown in FIG. 4, the light-conducting fibers of the fiber-optical bundle 26 are arranged parallel to the bundle axis 28 and are glued into the mount 24. A planar end face 30' which resides obliquely relative to the longitudinal axis 28 of the bundle is ground at the end of the fiber-optical bundle 26.

In the two exemplary embodiments of FIGS. 3 and 4, therefore, the end faces 16' of all light-conducting fibers 10 are at an angle $\delta$ relative to the center axis 20 of every light-conducting fiber, as shown in FIG. 2. This relationship of the end face 16' of each fiber to the center axis 20 provides means for illuminating an optimally large object field with retention of spectral light transmission characteristics.

I claim:

1. In an apparatus for coupling a light conducting cable to a proximal end of an optical bundle of light conducting fibers used in a technical or medical instrument, particularly in an endoscope or technoscope, the proximal end having a mount and being provided with a single planar end face, the improvements comprising means for illuminating an optimally large object field with retention of spectral light transmission characteristics, said means increasing the exit angle of the distal end of the optical bundle and including a center axis of each of the light conducting fibers of the optical bundle extending at an angle differing from 90° to the plane of the end face of the proximal end.

2. An apparatus according to claim 1, wherein the center axes of all of the light conducting fibers of the bundle adjacent the proximal end extend parallel to the axis of the bundle and the single planar end face of the bundle is arranged at an angle differing from 90° relative to the longitudinal axis of the bundle.

3. An apparatus according to claim 2, wherein the planar end face of the bundle is arranged at an angle differing from 90° by about 10°.

4. In an apparatus for coupling a light conducting cable to a proximal end of an optical bundle of light conducting fibers used in a technical or medical instrument, particularly in an endoscope or technoscope, the proximal end having a mount and being provided with a single planar end face, the improvements comprising means for illuminating an optimally large object field with retention of spectral light transmission characteristics, said means including a center axis of each of the fibers being arranged at an angle to the axis of the bundle and the single planar end face extending perpendicular to the longitudinal axis of the bundle so that each of the light conducting fibers of the optical bundle extends at an angle differing from 90° to the plane of the end face of the proximal end.

5. An apparatus according to claim 4, wherein the center axis of each fiber is arranged at an angle of about 10° to the axis of the bundle.

6. A method for manufacturing an apparatus for coupling a light conducting cable to a proximal end of an optical bundle of light conducting fibers, said proximal end being in a mount and being provided with a single planar end face with the axes of the fibers of the bundle extending at an angle other than 90° to the end face of the bundle to provide means for illuminating an optimally large object field with retention of spectral light transmission characteristics, said method comprising the steps of arranging the light conducting fibers of the optical bundle to extend parallel to the longitudinal axis of the bundle, fixing a mount to the proximal end of said bundle, then grinding the end of the bundle and mount to form a single planar end face extending at an angle differing from 90° relative to the longitudinal axis of the bundle.

7. A method according to claim 6, wherein said step of grinding forms an end face extending at an angle of about 80° to the longitudinal axis of the bundle.

8. A method for manufacturing an apparatus for coupling the light conducting cable to a proximal end of an optical bundle of light connecting fibers, said proximal end having a mount and being provided with a single planar end face with the axes of the optical fibers of the bundle extending at an angle other than 90° to the end face to provide means for illuminating an optimally large object field with retention of spectral light transmission characteristics, said method comprising the step of arranging the optical fibers in a bundle, rotating the fibers so that the axis of each of the fibers extend at a predetermined angle relative to the longitudinal axis of the bundle, fixing the proximal end of the bundle of fibers in a mount, then grinding the end of the mount and bundle in a plane extending perpendicular to the longitudinal axis of the bundle.

9. A method according to claim 8, wherein said step of rotating moves the fibers so that the predetermined angle is approximately 10°.

* * * * *